United States Patent [19]

Koller et al.

[11] 4,168,264
[45] Sep. 18, 1979

[54] 1,3,3-TRIMETHYL-2-METHYLENE INDOLINE CATIONIC N-METHYL AZO DYES

[75] Inventors: Stefan Koller, Ramlinsburg; Rudolf Zink, Bottmingen; Kurt Burdeska, Basel, all of Switzerland

[73] Assignee: Ciba-Geigy Corporation, Ardsley, N.Y.

[21] Appl. No.: 813,150

[22] Filed: Jul. 5, 1977

[30] Foreign Application Priority Data

Jul. 19, 1976 [LU] Luxembourg .......................... 75414

[51] Int. Cl.² ............................................. C09B 43/00
[52] U.S. Cl. ................................ 260/165; 260/146 R;
260/575; 542/417
[58] Field of Search ........................... 260/146 R, 165

[56] References Cited
U.S. PATENT DOCUMENTS
3,769,279  10/1973  Kuhlthau et al. ................ 260/165 X FOREIGN PATENT DOCUMENTS
647876  9/1962  Canada ..................................... 260/165

Primary Examiner—Charles F. Warren
Attorney, Agent, or Firm—Michael W. Glynn

[57] ABSTRACT

New yellow cationic dyes of the formula

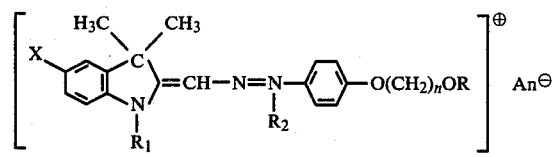

are disclosed wherein
  X represents hydrogen or halogen,
  R represents an optionally substituted alkyl group or cycloalkyl group,
    or —CH$_2$— if this is linked with the phenylene group in the o-position with respect to the oxygen bond to form a 6-membered ring and n represents 1,
  R$_1$ represents an unsubstituted, straight-chain or branched-chain alkyl group having 1 to 5 carbon atoms,
  R$_2$ represents a substituted, or preferably unsubstituted, straight-chain or branched-chain alkyl group having 1 to 5 carbon atoms,
  n represents the numbers 1 or 2, and
  An represents an anion, which dyes are useful for dyeing and printing of textile material especially polyacrylonitrile.

6 Claims, No Drawings

1,3,3-TRIMETHYL-2-METHYLENE INDOLINE CATIONIC N-METHYL AZO DYES

The invention relates to new cationic dyes, to processes for producing them and to their use for dyeing and printing materials dyeable with cationic dyes.

New cationic dyes have been found which correspond to the general formula I

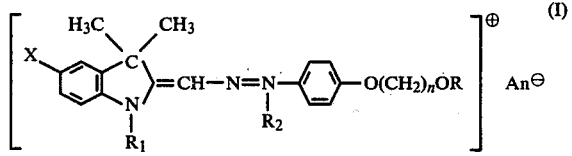

wherein

X represents hydrogen or halogen, such as fluorine, chlorine or bromine,

R represents an optionally substituted alkyl or cycloalkyl group, particularly the cyclohexyl group, an also —CH$_2$— if —CH$_2$— is linked with the phenylene group in the o-position with respect to the oxygen bond to form a 6-membered ring and n represents 1, R$_1$ represents an unsubstituted, straight-chain or branched-chain alkyl group having 1 to 5 carbon atoms, such as the methyl, ethyl or n- and iso-propyl group, the n-, sec.- and tert.-butyl group or the pentyl group, R$_2$ represents a substituted, or preferably unsubstituted, straight-chain or branched-chain alkyl group having 1 to 5 carbon atoms, such as the methyl, ethyl or n- and isopropyl group, the n-, sec.- and tert.-butyl group, or the pentyl or benzyl group, n represents the number 1 or 2, and An represents an anion.

As an alkyl group, R can be straight-chain or branched-chain and has 1 to 5 carbon atoms. It is for example the methyl, ethyl, n- and iso-propyl and n-butyl group. This group can be optionally substituted. Suitable substituents are, e.g., phenyl, alkoxy having 1 to 4 carbon atoms, such as methoxy and ethoxy, cyano and alkoxy-(C$_1$-C$_3$)-CO. In preferred dyes, R represents the —CH$_2$— group which is linked with the phenylene group in the o-position with respect to the oxygen bond to form a 6-membered ring, and n is 1, or wherein n is 2 and R represents an unsubstituted alkyl group having 1 to 4 carbon atoms. "An" as an anion represents both organic and inorganic ions, such as halogen, e.g., the ions of chloride, bromide or iodide, sulphate, methyl sulphate, aminosulphonate, perchlorate, carbonate, bicarbonate, phosphate, phosphomolybdate, phosphotungstate, phosphotungstomolybdate, benzenesulphonate, naphthalenesulphonate, 4-chlorobenzenesulphonate, oxalate, maleinate, acetate, propionate, lactate, succinate, chloroacetate, tartrate, malate, methanesulphonate or benzoate; or complex anions, such as that of zinc chloride double salts.

Particularly preferred cationic dyes are those of the formula I wherein X represents hydrogen, R$_1$ and R$_2$ independently of one another represent an unsubstituted, straight-chain or branched-chain alkyl group having 1 to 3 carbon atoms, R represents an unsubstituted alkyl group having 1 to 5 carbon atoms, n is 2, and An represents an anion.

Of special interest are the dyes of the formula

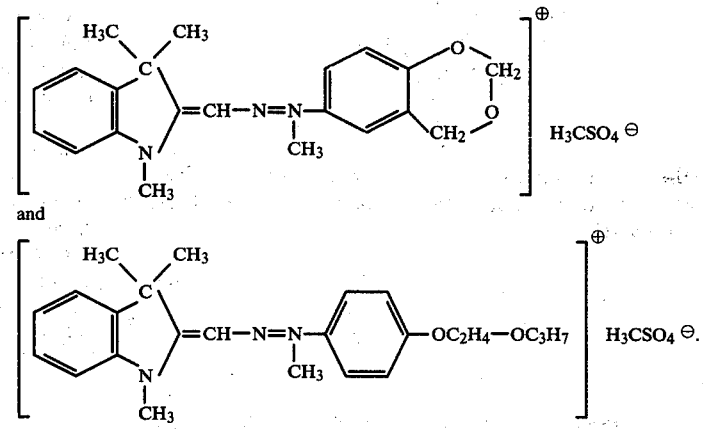

and

The formula I in this case represents only one of the possible tautomeric forms.

The new cationic dyes of the formula I according to the invention are yellow dyes which can, if required, be converted into dye preparations, with processing, e.g., into stable liquid or solid preparations, being carried out in a generally known manner, such as by grinding, by granulating or by dissolving in suitable organic solvents and/or water.

The new cationic dyes according to the invention are used for the dyeing and, with the addition of binders, for the printing of materials dyeable with cationic dyes, particularly textile materials which advantageously consist, e.g., of homopolymers or copolymers of acrylonitrile, or of synthetic polyamides or polyesters which are modified by acid groups. Furthermore, the new cationic dyes are used for dyeing plastics materials, leather and paper. Dyeing is performed preferably from an aqueous, neutral or acid medium using the exhaust process, optionally under pressure, or using the continuous process. The textile material can be in the most varied forms, for example in the form of fibres, filaments, fabrics, knitwear, piece goods and finished articles, such as shirts and pullovers.

The dyes according to the invention can also be added to spinning solutions for producing fibres containing polyacrylonitrile, or can be applied to the unstretched fibres, where their very good solubility in the dye bath and their stability to rhodanide have an advantageous effect.

There can be produced by application of these dyes very deep, level gold-yellow dyeings and printings which are distinguished by very good fastness to light, decatising, washing and perspiration. The cationic dyes according to the invention are also suitable for producing, together with known cationic dyes, valuable combination dyeings. The dyes also have a good pH stability.

Those dyes of the formula I which have good solubility in organic solvents, such as perchloroethylene, are suitable also for dyeing the textile materials mentioned, or for dyeing, e.g., plastics materials, from this organic medium.

The new cationic dyes of the formula I can be produced by various methods, advantageously by a process comprising reacting a compound of the formula II

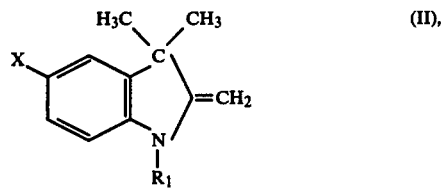

wherein the symbols X and $R_1$ have the meanings given under the formula I, with a diazotised amine of the formula III

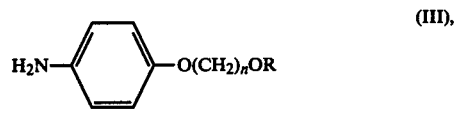

wherein the symbols R and n have the meanings given under the formula I; and alkylating the resulting reaction product with an alkylating agent introducing the radical $R_2$.

The compounds of the formula II are known: they are in this case indolines, such as 1,3,3-trialkyl-2-methylene indolines, especially 1,3,3-trimethyl-2-methylene indoline and 1,3,3-trimethyl-5-chloro-2-methylene indoline.

The amines of the formula III are new but can be produced by known methods, e.g., by reaction of p-nitrochlorobenzene with an alcohol HO(CH$_2$)$_n$OR, and subsequent reduction of the nitro group to the amino group. Suitable amines of this kind are, for example, 1-methoxy-2-(4-aminophenoxy)-ethane, 1-ethoxy-2-(4-aminophenoxy)-ethane, 1-n-propoxy-2-(4-aminophenoxy)-ethane, 1-isopropxy-2-(4-aminophenoxy)-ethane, 1-benzyloxy-2-(4-aminophenoxy)ethane or 1-cyclohexyloxy-2-(4-aminophenoxy)-ethane.

The reaction of the compound of the formula II with the compound of the formula III is performed in a known manner, and likewise the subsequent alkylation. The last-mentioned can be performed, e.g., in an inert solvent, or optionally in an aqueous suspension, or without solvent in an excess of the alkylating agent, if necessary at elevated temperature.

Suitable alkylating agents are, e.g., alkyl halides, e.g., methyl chloride or ethyl chloride, methyl bromide or ethyl bromide or methyl iodide or ethyl iodide, alkyl sulphates such as dimethyl sulphate, benzyl chloride, chloroacetic acid amide, epoxides such as ethylene oxide, epichlorohydrin, etc.

After alkylation, the new dyes are separated from the reaction medium and dried.

The invention relates further to the new intermediates of the formula III

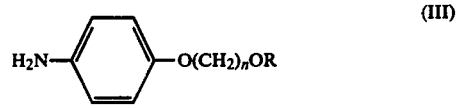

wherein

R represents an optionally substituted alkyl group or cycloalkyl group, or —CH$_2$— if this is linked with the phenylene group in the o-position with respect to the oxygen bond to form a 6-membered ring, and n represents the numbers 1 or 2.

In preferred intermediates, n represents 1, and R represents the —CH$_2$— group which is linked with the phenylene group in the o-position with respect to the oxygen bond to form a 6-membered ring; or n represents 2, and R represents an unsubstituted alkyl group having 1 to 4 carbon atoms.

In the following Examples, 'parts' denote parts by weight, percentages are percent by weight and temperatures are degrees centigrade.

EXAMPLE 1

15.1 parts of 5-aminosaligenin methylene ether are dissolved in 30 parts of 10 N hydrochloric acid and 150 parts of water. An addition of 25 parts of 4 N sodium nitrite is made dropwise at 0° to 5° within 30 minutes. To this diazo solution are added 17.3 parts of 1,3,3-trimethyl-2-methylene indoline, and the coupling is finished at pH 7 with sodium hydroxide solution. The precipitated dye is filtered off and dried. The 33 parts of dye thus obtained are dissolved in 250 parts of chlorobenzene at 100°, and to the solution are added 5 parts of magnesium oxide and 19 parts of dimethyl sulphate. After 1½ hours at 100° to 110°, the quaternisation is complete and the dye salt of the formula

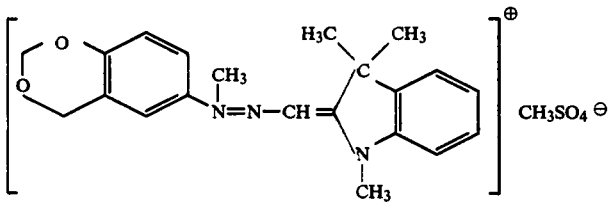

is filtered off at 25° and dried. This dyes polyacrylonitrile in a gold-yellow shade. The dyeings have very good fastness to light and to decatising.

EXAMPLE 2

19.5 parts of 1-n-propoxy-2-(4-aminophenoxy)-ethane are dissolved in 150 parts of water with 30 parts of 10 N hydrochloric acid. Diazotising is performed at 0° to 5° in the usual manner with 25 parts of 4 N sodium nitrite. To this diazo solution are added 17.3 parts of 1,3,3-trimethyl-2-methylene indoline, and coupling is performed at pH 5 to 6 with ammonia as buffer. The precipitated dye is filtered off and dried; yield: 37.5 parts. This is dissolved in 250 parts of chlorobenzene at 100°; 6 parts of magnesium oxide are then added and quaternising is effected with 19 parts of dimethyl sulphate in 45 minutes at 95°. The product of the formula methyl sulphate, of 15 to 20 equivalents of ethylene oxide with N-octadecylidiethylenetriamine, and 100 g of polyacrylonitrile fabric is introduced at 60°. The bath is heated to 100° within 30 minutes, and the fabric is dyed in the boiling liquor for 90 minutes. The liquor is then allowed to cool in the course of 30 minutes to 60°.

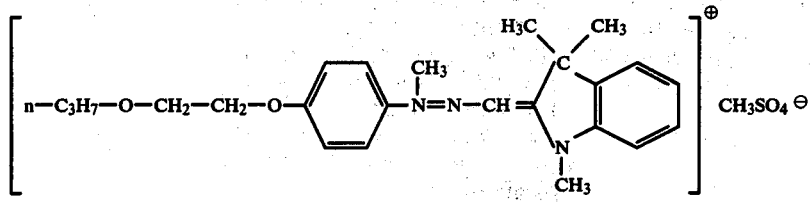

is filtered off at 25° and dried at 70°. It has very good solubility in water and produces on polyacrylonitrile fibres gold-yellow dyeings having excellent fastness to decatising and a high degree of fastness to light.

If the procedure is carried out in a manner analogous to that according to Example 2 except that, instead of the employed amino compound, there are used equivalent parts of a like compound according to the following Table, column II, and, instead of 1,3,3-trimethyl-2-methylene indoline, equivalent parts of the indolines given in column III, with alkylation being performed with the alkylating agents shown in column IV, cationic dyes of which the shade on polyacrylonitrile (PAN) is given in column V are obtained.

The dyed material is taken out and subsequently rinsed with lukewarm water and with cold water.

There is obtained a pure, reddish-yellow polyacrylonitrile dyeing which is fast to light and to decatising.

EXAMPLE 27

Production of the intermediate, 1-n-ethoxy-2-(4-aminophenoxy)-ethane of the formula

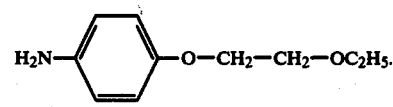

| Ex. No. | R | n | $R_1$ | X | Alkylating agent | Shade on PAN |
|---|---|---|---|---|---|---|
| 3 | —$CH_2$— * | 1 | —$CH_3$ | H | diethyl sulphate | gold-yellow |
| 4 | —$CH_2$— * | 1 | —$CH_3$ | Cl | dimethyl sulphate | " |
| 5 | —$CH_3$ | 2 | —$CH_3$ | H | " | " |
| 6 | —$CH_3$ | 2 | —$CH_3$ | Cl | " | " |
| 7 | —$C_2H_5$ | 2 | —$CH_3$ | H | " | " |
| 8 | —$C_2H_5$ | 2 | —$CH_3$ | H | diethyl sulphate | " |
| 9 | —$C_2H_5$ | 2 | —$CH_3$ | Cl | dimethyl sulphate | " |
| 10 | n-$C_3H_7$ | 2 | —$CH_3$ | H | diethyl sulphate | " |
| 11 | n-$C_3H_7$ | 2 | —$CH_3$ | Cl | dimethyl sulphate | " |
| 12 | iso-$C_3H_7$ | 2 | —$CH_3$ | H | " | " |
| 13 | n-$C_4H_9$ | 2 | —$CH_3$ | H | " | " |
| 14 | n-$C_4H_9$ | 2 | —$CH_3$ | Cl | " | " |
| 15 | n-$C_3H_7$ | 2 | —$CH_3$ | H | n-propyl bromide | " |
| 16 | n-$C_3H_7$ | 2 | —$CH_3$ | Br | dimethyl sulphate | " |
| 17 | —$CH_2C_6H_5$ | 2 | —$CH_3$ | H | " | " |
| 18 | cyclohexyl | 2 | —$CH_3$ | H | " | " |
| 19 | —$CH_3$ | 1 | —$CH_3$ | H | " | " |
| 20 | —$CH_2C_6H_5$ | 1 | —$CH_3$ | H | " | " |
| 21 | —$C_2H_4OCH_3$ | 2 | —$CH_3$ | H | " | " |
| 22 | —$C_2H_4CN$ | 2 | —$CH_3$ | H | " | " |
| 23 | —$C_2H_4COOCH_3$ | 2 | —$CH_3$ | H | " | " |
| 24 | —$CH_3$ | 2 | —$CH_3$ | H | benzyl chloride | " |
| 25 | —$CH_3$ | 2 | —$CH_3$ | H | acrylamide | " |

EXAMPLE 26

5 g of the dye produced according to Example 1 is stirred to a paste with 2 g of 40% acetic acid, and is taken into solution by the addition of 4000 g of hot water. To the solution are added 1 g of sodium acetate and 2 g of an addition product, quaternised with di- 157.6 g of 1-chloro-4-nitrobenzene and 108.1 g of ethylene glycol monoethyl ether are dissolved in 300 ml of dimethyl sulphoxide, and to this solution is added within 30 minutes, with slight cooling with ice water, 123.42 g of a 50% aqueous potassium hydroxide solution. The reaction is slightly exothermic and the temperature rises after removal of cooling to about 45°. The reaction mixture is then heated to 65° to 70° and is stirred overnight at this temperature. It is subsequently allowed to flow, with good stirring, into a mixture of 3 liters of water and ice. The precipitated product is stirred ice-cold for 15 minutes, then filtered off, washed with water and dried in vacuo. The yield of 1-n-ethoxy-2-(4-nitrophenoxy)-ethane is 179 g (85% of theory); m.p.=67° to 68°.

The 1-n-ethoxy-2-(4-nitrophenoxy)-ethane is reduced with Raney nickel in the usual way to 1-n-ethoxy-2-(4-aminophenoxy)-ethane.

The amine is a slightly yellow oil, b.p.$_{0.05}$ mm 110°.

We claim:

1. Cationic dyes of the formula

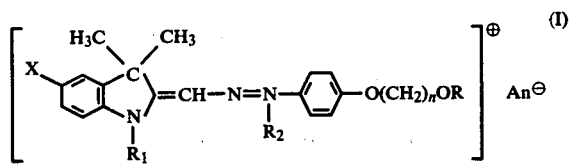

wherein
X is hydrogen or halogen, R is cyclohexyl, or alkyl of 1–5 carbon atoms which is unsubstituted or substituted by phenyl, alkoxy of 1–4 carbon atoms, cyano or alkoxycarbonyl where the alkoxy moiety thereof has 1–3 carbon atoms; or R is —CH$_2$— where the —CH$_2$— group is attached to the phenylene group in the o-position with respect to the oxygen bond to form a six membered ring such that n is 1, R$_1$ is unsubstituted straight or branched chain alkyl of 1–5 carbon atoms, R$_2$ is a straight or branched chain alkyl of 1–5 carbon atoms which is unsubstituted or substituted by phenyl, n is 1 or 2, and An is an anion.

2. Cationic dyes of the formula I according to claim 1, wherein n represents 1, and R represents the —CH$_2$— group which is linked with the phenylene group in the o-position with respect to the oxygen bond to form a 6-membered ring.

3. Cationic dye according to claim 2 of the formula

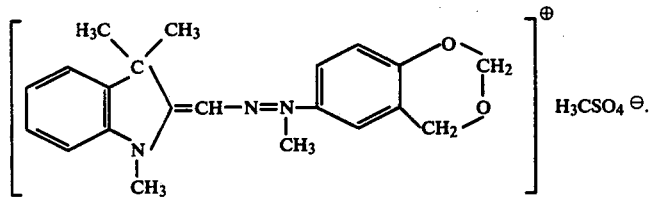

4. Cationic dyes of the formula I according to claim 1, wherein n represents 2, and R represents an unsubstituted alkyl group having 1 to 4 carbon atoms.

5. Cationic dyes of the formula I according to claim 1, wherein X represents hydrogen, R$_1$ and R$_2$ independently of one another represent an unsubstituted, straight-chain or branched-chain alkyl group having 1 to 3 carbon atoms, R represents an unsubstituted alkyl group having 1 to 5 carbon atoms, n represents the number 2, and An represents an anion.

6. Cationic dye according to claim 5 of the formula

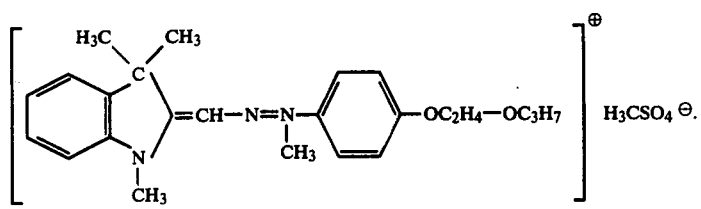

* * * * *